United States Patent [19]

Cloud et al.

[11] Patent Number: 5,772,380
[45] Date of Patent: Jun. 30, 1998

US005772380A

[54] ROTO-SLOT ADJUSTABLE ATTACHMENT DEVICE

[75] Inventors: Mark L. Cloud, Seattle; Christopher L. Schwitters, Everett, both of Wash.

[73] Assignee: The Boeing Company, Seattle, Wash.

[21] Appl. No.: 771,104

[22] Filed: Dec. 20, 1996

[51] Int. Cl.$^6$ .............................. F16B 19/00; F16B 21/00
[52] U.S. Cl. ......................... 411/508; 411/339; 411/539; 248/635
[58] Field of Search ................................... 411/338, 339, 411/508, 509, 510, 539, 913; 248/635

[56] References Cited

U.S. PATENT DOCUMENTS

| | | | |
|---|---|---|---|
| 4,035,874 | 7/1977 | Liljendahl | 411/339 X |
| 4,858,880 | 8/1989 | Durand | 248/635 |
| 4,878,792 | 11/1989 | Frano | 411/339 |
| 5,170,985 | 12/1992 | Killworth et al. | 248/635 |
| 5,172,999 | 12/1992 | Ijima et al. | 411/508 X |
| 5,250,058 | 10/1993 | Miller et al. | 411/509 X |
| 5,335,893 | 8/1994 | Opp | 248/635 |
| 5,443,526 | 8/1995 | Hoerner | 411/539 X |
| 5,449,153 | 9/1995 | Catalano et al. | 267/141.4 |
| 5,460,348 | 10/1995 | Cox | 248/638 |
| 5,464,187 | 11/1995 | Linkner, Jr. | 248/635 |

*Primary Examiner*—Neill R. Wilson
*Attorney, Agent, or Firm*—Thomas W. Hennen

[57] ABSTRACT

A lightweight, two piece adjustable attachment device provides simple installation into a part, develops robust strength, and enables alignment of a retaining screw or bolt axis with the longitudinal axis of a threaded mounting hole, despite part to mount misalignment caused by tolerance build-up in a complex assembly. The adjustable attachment device is designed to provide sufficient overlap on each side of the part of the edges of the circular receiving aperture that the adjustable attachment device is able to withstand great force without pulling out of the part. The adjustable attachment device includes a fastener receiving slot that extends across the adjustable attachment device. The adjustable attachment device is installed into a circular receiving aperture in a part to be assembled onto a larger assembly. Two halves of the adjustable attachment device lock together through the circular receiving aperture using resilient retaining projections on a plug half that interlock with projection receiving sockets on a receptacle half. A raised circular plateau provides a shoulder that closely engages the edge of the circular receiving aperture and constrains movement of the adjustable attachment device to rotation. When so installed, the adjustable attachment device rotates freely within the circular receiving aperture. The part may then be positioned for assembly to the larger assembly, and the adjustable attachment device rotated to intersect the long axis of the fastener retaining slot with the longitudinal axis of the threaded mounting hole. The screw or bolt may then be installed in the normal manner to retain the part to the assembly, despite positional error caused by tolerance build-up.

9 Claims, 5 Drawing Sheets

ROTO-SLOT ADJUSTABLE ATTACHMENT DEVICE

BACKGROUND OF THE INVENTION

1. Field of the Invention

This invention pertains to the field of adjustable alignment mounting devices. With greater particularity, the invention pertains to devices for facilitating attachment of a part to a mount located in a predefined position attached to adjacent structure. With greatest particularity, the invention pertains to a robust, two piece, interlocking, adjustable attachment device having a fastener receiving slot for installation on a part to facilitate connecting that part to a mount located in a predefined position and attached to adjacent structure that is subject to positional error caused by tolerance build-up of assembled component parts.

2. Background Information

In general, complex structures present greater assembly challenges than do simple structures. This is because complex structures use a larger number of parts than do simple structures, and dimensional variation from one part to another may cause correctly made parts to not fit to an assembly of other parts. Component parts of assemblies are designed to be acceptable for use if their actual manufactured dimensions fall within a specified range of variation, either larger or smaller, than the dimensions specified as nominal dimensions for that part. This acceptable variation is termed a manufacturing tolerance, as is well known.

When an assembly is comprised of a collection of such "within tolerance" parts, the fit of any particular part to the remaining assembly will depend on the somewhat unpredictable combined effect of the actual dimensions of that part and the actual dimensions of all the other parts chosen for that assembly. If many dimensions of parts chosen for an assembly are at the larger than nominal end of the tolerance range, the dimensional variations will add so that it may become impossible to fit the next part without reworking the assembly. Similarly, if many dimensions are at the smaller than nominal end of the tolerance range, the same result may occur. If certain dimensions are larger than nominal and certain dimensions smaller than nominal, the resulting assembly may compensate for such variation in dimensions and any particular part fit may be near nominal despite the fact that some parts are larger than nominal, while other parts are smaller than nominal.

Further, comparing several examples of the same within tolerance part reveals that each will be slightly different from any other, though all will be within the specified manufacturing tolerance. Thus the assembly of a collection of such parts will result in each completed assembly being a somewhat unique structure, and the addition of each incremental part during the assembly phase will present a greater or lesser fitting challenge depending upon the particular effects of this "tolerance build-up". The phenomenon of tolerance build-up is a problem in the commercial airplane manufacturing industry, but is also present in all manufacturing industries to varying degrees.

One method for reducing the problem of tolerance build-up is by manufacturing component parts with smaller acceptable ranges of dimensional variation (smaller tolerances). Although this method may provide a more accurate assembled structure, it also can greatly increase manufacturing cost. Manufactured component parts having dimensions out of the specified dimensional range that would have been acceptable with a previously larger tolerance, now must be reworked or scrapped and this additional cost must be added to the cost of the now smaller yield of acceptable parts, increasing their price to the consumer.

Manufacturers have also attempted to deal with the assembly problems caused by tolerance build-up by introducing features that provide a fit adjustment capability into parts using such techniques as slotted holes, and specialized movable brackets. Although it is well known that by providing adjustable features, the effects of tolerance build-up can be mitigated, a remaining problem is how best to introduce such features into an existing part design. Such solutions built into the part increase part complexity and cost. Solutions that lack robustness may not be able to withstand typical loads in service and may pull loose. Elaborate tolerance build-up compensating features usually add to part count, can be expensive, can be difficult to install, requiring more highly skilled mechanics and taking more time, can add unnecessary weight, and can thereby increase manufacturing costs as well as maintenance and operating costs for the ultimate customer.

SUMMARY OF THE INVENTION

These and other problems have been solved by the present invention that provides features and advantages to easily compensate for the effects of tolerance build-up, while providing a simplified but robust installation of an inexpensive, lightweight adjustable attachment device.

A two piece device, termed the Roto-Slot adjustable attachment device, is designed to be easily manufactured by the well known injection molding process, and to be easily assembled and attached to a part by an installation mechanic during part installation. The adjustable attachment device may advantageously be injection molded using a composite plastic and glass sphere filled material commonly used and known in the aircraft industry by the acronym "PEEK" (for polyetheretherketone). The resulting adjustable attachment device is fire retarding, strong, effective, easily installed and lightweight.

The adjustable attachment device comprises two halves that fit together, a receptacle half and a plug half. The receptacle half is designed to include a raised plateau that provides a circular shoulder to fit within a circular receiving aperture in the part to be installed. The receptacle half includes a fastener receiving slot and a plurality of projection receiving sockets. The plug half has a plurality of resilient retaining projections aligned with the positions of the projection receiving sockets on the receptacle half, and a corresponding fastener receiving slot that is aligned with the receptacle half fastener receiving slot when the two adjustable attachment device halves are assembled.

The two halves are assembled by merely placing a receptacle half on one side of the part circular receiving aperture, and engaging the shoulder defined by the raised plateau with the edge of the part circular receiving aperture. The plug half is then placed on the other side of the part, and the resilient retaining projections on the plug half aligned with the projection receiving sockets on the receptacle half. Next, the mechanic presses the two halves together so that the resilient retaining projections enter the projection receiving slots. Each resilient retaining projection is shaped with a barb or latching feature at its tip. The mechanic presses the two halves until the barb on each of the resilient retaining projections passes through the projection retaining socket and resiliently springs back and latches against the backside of the receptacle half.

Once so installed, the Roto-Slot adjustable attachment device will remain installed in the circular receiving aperture but will be able to rotate therein freely. An attaching screw or bolt may then be aligned through the adjustable attachment device with the threaded hole in its corresponding mount by positioning the part for installation, and then rotating the installed Roto-Slot adjustable attachment device to intersect the long axis of the fastener receiving slot with the longitudinal axis of a threaded hole in the mount. The screw or bolt is then inserted through the fastener receiving slot along the longitudinal axis of the threaded hole to engage the threaded hole in the mount, and is then installed in the normal manner.

This two piece design enables simple installation of the adjustable attachment device at the point of use by persons of ordinary skill. The two piece design ensures a more secure attachment to the part with greater overlap at the edges of the aperture to resist being pulled through than if a one piece insert were installed by deforming it through the circular receiving aperture, relying on material springback to retain the insert in the aperture.

This ability to adjust screw or bolt position permits the screw or bolt to align with the threaded hole on the mount despite relative positioning error caused by tolerance build-up, thereby accommodating a within tolerance relative positioning error between the part and the mount in the two dimensional plane of the circular receiving aperture.

BRIEF DESCRIPTION OF THE DRAWING(S)

These and other features of the present invention will be explained in further detail in the following detailed description and with reference to the following drawing figures, wherein.

DESCRIPTION OF A PREFERRED EMBODIMENT

Figure 1:
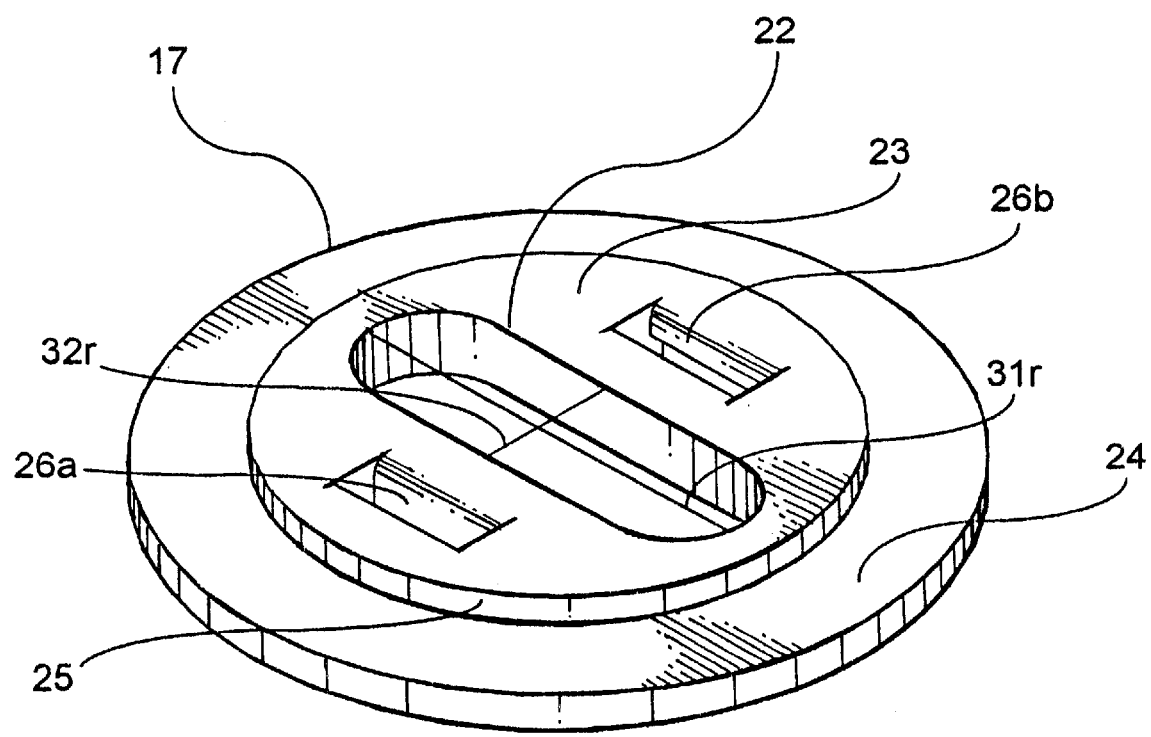
FIG. 1 illustrates the receptacle half of a Roto-Slot adjustable attachment device.

Referring now to the drawing wherein like reference characters refer to like parts and elements throughout the several figures, there is shown in FIG. 1 a receptacle half 17 having a fastener receiving slot 22 that has a long axis 31$r$ and a short axis 32$r$. Receptacle half 17 has centrally located, a circular plateau 23 the edge of which defines a circular step or shoulder 25. Receptacle half 17 also has a plurality of projection receiving sockets 26$a$ and 26$b$, although any number of such sockets greater than or equal to two could be used if necessary. Finally, receptacle half 17 has peripheral lip 24 that has a greater diameter than circular plateau 23. Peripheral lip 24 and the exterior diameter of plug half 18 are both sufficiently large that they provide significant overlap around the edge of circular receiving aperture 14 and sandwich it between them for a robust attachment to part 13. This overlap makes the Roto-Slot adjustable attachment device firmly attached to the part 13 and very resistant to pull-through from either side, so that forces applied to the installed part are reliably transferred through the Roto-Slot adjustable attachment device and fastener 19 to the shock absorbing mount 15.

Figure 2:
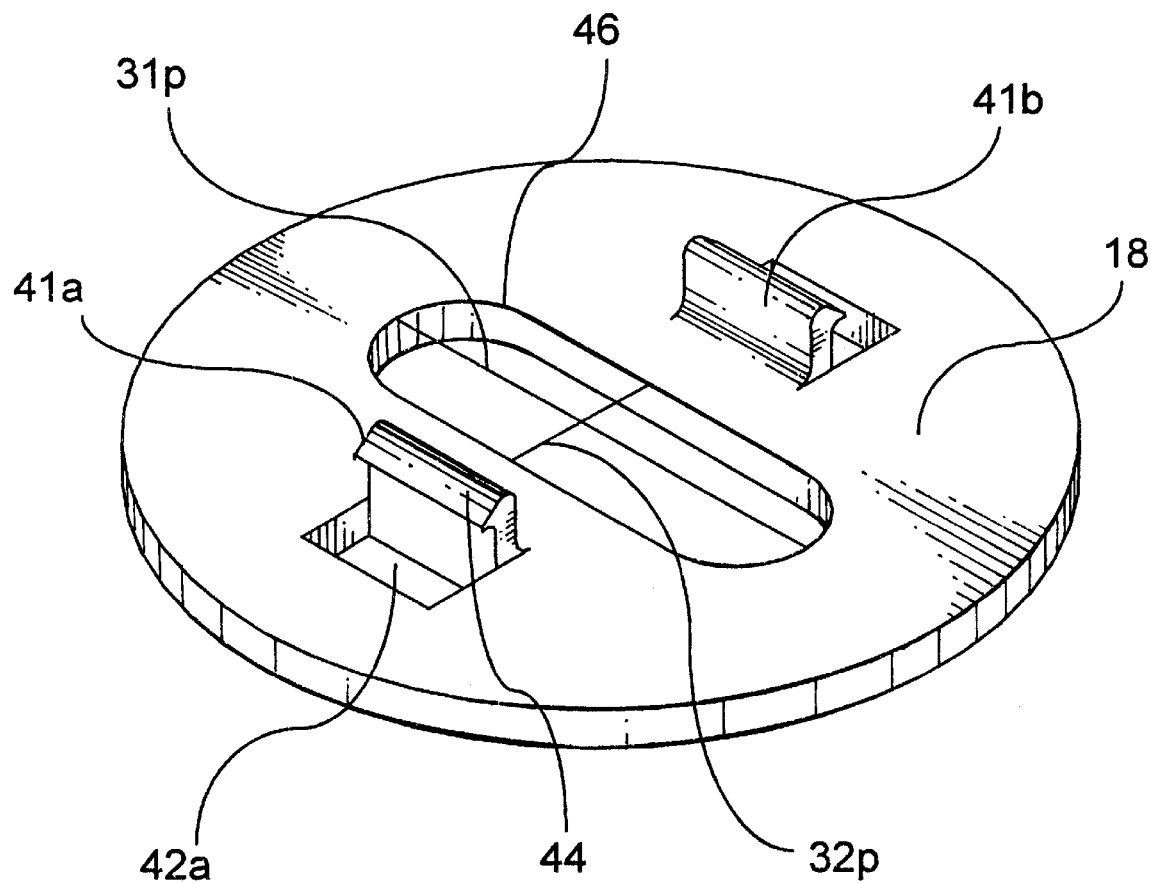
FIG. 2 illustrates the plug half of a Roto-Slot adjustable attachment device.

FIG. 2 shows the complementary half of the Roto-Slot adjustable attachment device, the plug half 18. A prominent feature of plug half 18 is fastener receiving slot 46 that corresponds in dimensions to fastener receiving slot 22 in receptacle half 17. Fastener receiving slot 46 similarly has a long axis 31$p$ and a short axis 32$p$.

The most distinguishing characteristic of plug half 18 is the plurality of resilient retaining projections represented in FIG. 2 by projections 41$a$ and 41$b$. Adjacent each projection is a open space 42$a$ resulting from the forming method used to shape projection 41$a$. The number of resilient retaining projections 41$a$ used could be any number of two or more, but the number and position should correspond to the position of corresponding projection receiving sockets 26$a$ on receptacle half 17. When each resilient retaining projection 41$a$ is aligned with its corresponding projection receiving socket 26$a$, fastener receiving slots 22 and 46 should be aligned with their long axes 31$r$ and 31$p$, and their short axes 32$r$ and 32$p$, parallel.

Figure 3:
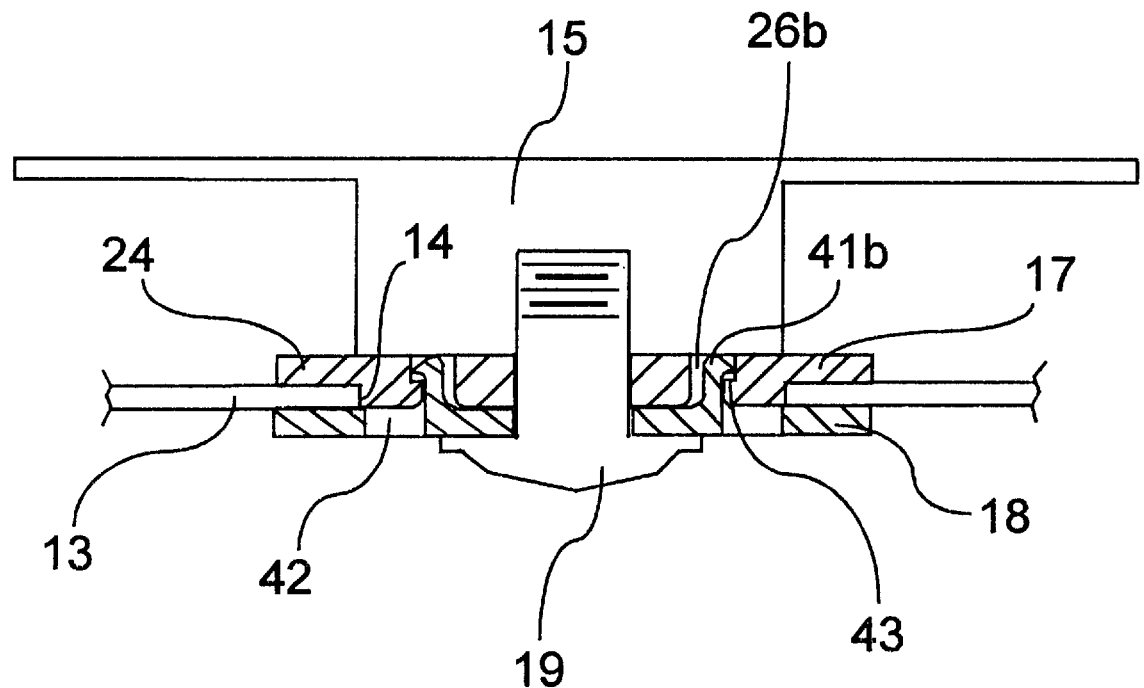
FIG. 3 illustrates a sectional view of a Roto-Slot adjustable attachment device that has been installed.

FIG. 3 illustrates a sectional view of an installed Roto-Slot adjustable attachment device. A part 13, typically comprising a thin sheet metal or composite (glass fiber and resin) structure, is attached to a shock absorbing mount 15 that is itself rigidly attached to adjacent structure (not shown). Examining FIG. 3 carefully, one can see that resilient retaining projection 41$b$ has entered projectile socket 26$b$ and has latched over latching step 43 to resist being withdrawn from receptacle half 17. Shoulder 25 also has abutted circular receiving aperture 14 in part 13 to locate and retain receptacle half relative to part 13. Peripheral lip 24 is overlapping the edge of circular receiving aperture 14 and bears against part 13. Finally, fastener 19, which could be a bolt, screw or similar conventional fastener, is shown penetrating plug half 18 and receptacle half 17, and is threaded into a threaded hole in shock absorbing mount 15. The actual function of resilient retaining projections 41$b$ is to retain the receptacle half 17 and plug half 18 together in circular receiving aperture 14 until part 13 can be installed and fastener 19 installed. Once fastener 19 is installed, receptacle half 17 and plug half 18 will be held together by fastener 19.

Figure 4:
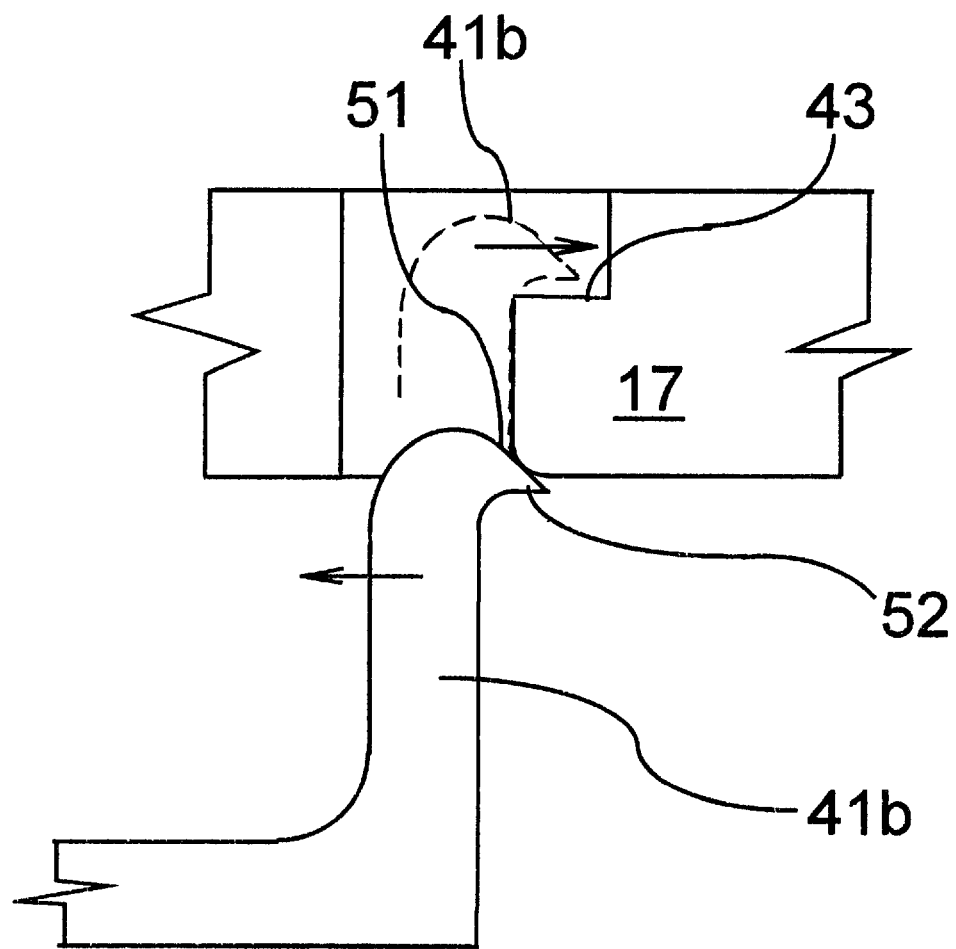
FIG. 4 illustrates the latching interaction of a Roto-Slot adjustable attachment device.

FIG. 4 illustrates the interaction of resilient retaining projection 41$b$ with receptacle half 17 during assembly. Resilient retaining projection 41$b$ has angled tip surface 44 and latching tip 51. This angled tip surface 44 contacts the rounded edge of projection receiving socket 26$b$, deflects to the left and enters projection receiving socket 26$b$. As the angle tip surface 44 of resilient retaining projection 41$b$ clears the back of receptacle half 17, it springs back to its original position and latching surface 51 latches against latching step 43. This locks plug half 18 to receptacle half 17 to form the installed Roto-Slot adjustable attachment device.

Fastener receiving slot 22 in receptacle half 17 and fastener receiving slot 46 in plug half 18 each have a long axis 31$r$ and 31$p$ respectively, defined to be parallel with the major direction of the slot, and a short axis 32$r$ and 32$p$ respectively that intersects its respective long axis at a right angle midway between ends of the slot. Shock absorbing mount 15 has a threaded hole for receiving a threaded fastener such as screw or bolt 19. This threaded hole has a longitudinal axis 16 that defines the required fastener alignment for successful assembly. Since tolerance build-up can play a part in making the assembly of part 13 to shock absorbing mount 15 difficult, the following feature is utilized to compensate for such tolerance build-up. After receptacle half 17 and plug half 18 are installed in a circular receiving hole 14 in a part 13, and latched together as described herein, the part 13 is positioned for assembly and the assembled halves, now termed a Roto-Slot adjustable attachment device, may be rotated in the plane of part 13 until long axis 31r and 31p are both aligned to intersect the longitudinal axis 16 of the threaded mounting hole in shock absorbing mount 15. Once intersection is achieved, a fastener 19 may be installed through fastener receiving holes 22 and 46 in their respective halves, and threaded into the threaded mounting hole in shock absorbing mount 15 to complete installation of part 13.

Figure 5:
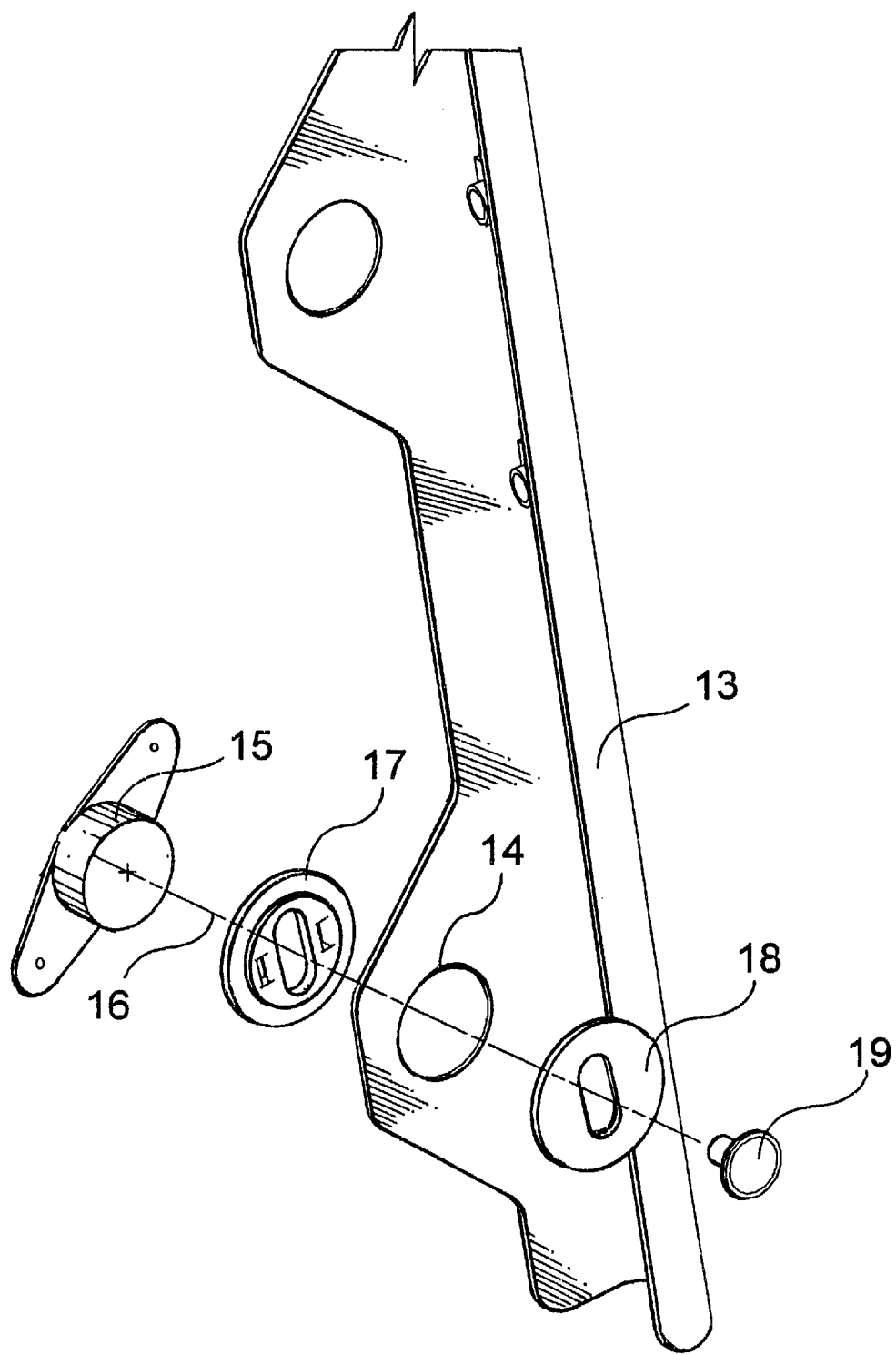
FIG. 5 is an exploded view showing the components of a Roto-Slot adjustable attachment device and structure being retained, in their relative positions just prior to installation.

As may be apparent from FIG. 5, the first step in installing a Roto-Slot adjustable attachment device is to place a receptacle half 17 on one side of a part 13 circular receiving aperture 14 and a plug half 18 on the other side of the circular receiving aperture 14, and then press the two halves together so that resilient retaining projections 41a on the plug half 18 engage projection receiving sockets 26a on the receptacle half 17 and latch into position, and the raised circular plateau 23 of the receptacle half 17 engages the circular receiving aperture 14. Once so installed, the Roto-Slot adjustable attachment device will remain installed in the circular receiving aperture 14 but will be able to rotate therein freely. An attaching screw or bolt 19 may be aligned with its corresponding shock absorbing mount by positioning the part for installation, and then rotating the Roto-Slot adjustable attachment device to intersect long axis 31p and 31r of the fastener receiving slot 22 and 46 with the longitudinal axis 16 of a threaded hole in the shock absorbing mount 15. The screw or bolt 19 is then inserted through the fastener receiving slot 22 and 46 to engage the threaded hole in the shock absorbing mount 15, and is installed in the normal manner. This permits the screw or bolt 19 to align with the threaded hole on the shock absorbing mount 15, thereby accommodating a within tolerance relative positioning error between part 13 and shock absorbing mount 15 in the two dimensional plane of circular receiving aperture 14.

While a particular embodiment has been described, it will be apparent to persons skilled in the art to which the present invention pertains, that many modifications and variations thereto are possible without departing from the spirit and scope of the invention. Accordingly, the scope of this invention should be considered limited only by the spirit and scope of the elements of the appended claims and their reasonable equivalents.

What is claimed is:

1. An adjustable attachment device for placement in a part having a circular receiving aperture for facilitating attachment of said part to adjacent structure, said adjustable attachment device comprising:

a receptacle half defining a periphery having a size selected to overlap the edges of said circular receiving aperture on a first side of said part, and defining a raised circular plateau having a height corresponding to the thickness of said part at said circular receiving aperture, said raised circular plateau being positioned relative to said receptacle half periphery and having a size selected for cooperative engagement of said circular receiving aperture for restraining said receptacle half to rotational motion in the plane of said circular receiving aperture, said receptacle half further defining a plurality of projection receiving sockets positioned on said raised circular plateau, and an elongated fastener receiving slot extending across said raised circular plateau; and a plug half having a periphery sized to overlap the edges of said circular receiving aperture on a second side of said part, and defining an elongated fastener receiving slot dimensionally corresponding to said elongated fastener receiving slot in said receptacle half, said plug half further defining a plurality of resilient retaining projections, said resilient retaining projections corresponding in number and relative position to said plurality of projection receiving sockets, each resilient retaining projection having an angled tip surface and including a latching feature for one way insertion and retention of said resilient retaining projection within one of said plurality of receptacle half projection receiving sockets, each resilient retaining projection being positioned relative to said plug half elongated fastener receiving slot so as to align with a corresponding one of said plurality of receptacle half projection receiving sockets when said receptacle half elongated fastener receiving slot aligns with said plug half elongated fastener receiving slot.

2. An adjustable attachment device as set forth in claim 1, comprising a composite plastic material having glass sphere filling.

3. An adjustable attachment device as set forth in claim 2, wherein said glass sphere filling comprises 10% by weight of said composite plastic material.

4. An adjustable attachment device as set forth in claim 1, comprising polyetheretherketone and glass spheres.

5. An adjustable attachment device as set forth in claim 1 made by an injection molding process.

6. An adjustable attachment device comprising:

a receptacle half having a central slot and a plurality of sockets; and a plug half having a central slot and a plurality of projections.

7. An adjustable attachment device as set forth in claim 6, further comprising: said receptacle half further defining a raised central plateau having a circular shoulder.

8. An adjustable attachment device as set forth in claim 6, further comprising:

said plug half projections having an angled surface and latching means for retaining said projections within said sockets.

9. An adjustable attachment device as set forth in claim 8, wherein said projections are resilient and deflect laterally when inserted into a corresponding socket, but spring back laterally to latch said plug half to said receptacle half.

* * * * *